United States Patent [19]

Schulz

[11] Patent Number: 4,514,162

[45] Date of Patent: Apr. 30, 1985

[54] APPLIANCE FOR HEATING AN ELECTROCONDUCTIVE MATERIAL IN THE FORM OF A CONTINUOUS STRAND

[75] Inventor: Eckhard Schulz, Wallenhorst, Fed. Rep. of Germany

[73] Assignee: Sicowa Verfahrenstechnik fur Baustoffee GmbH & Co. KG, Fed. Rep. of Germany

[21] Appl. No.: 459,951

[22] Filed: Jan. 21, 1983

[30] Foreign Application Priority Data

Jan. 30, 1982 [DE] Fed. Rep. of Germany ....... 3203131

[51] Int. Cl.[3] .............................................. B29C 15/00

[52] U.S. Cl. ........................ 425/174.8 R; 100/93 RP; 198/952; 219/10.71; 219/10.81; 264/26; 425/174.6; 425/329; 425/371

[58] Field of Search ................ 425/174.8 E, 174.8 R, 425/DIG. 13, 174.6, 371, 329; 264/25, 26; 219/10.71, 10.77, 10.81; 198/952; 100/93 RP

[56] References Cited

U.S. PATENT DOCUMENTS

| | | | |
|---|---|---|---|
| 1,024,122 | 4/1912 | Dawkins et al. | 425/174.8 E |
| 2,463,289 | 3/1949 | Leguillon | 425/174.8 R |
| 2,565,003 | 8/1951 | Simorda | 425/174.8 R |
| 2,838,640 | 6/1958 | Mann et al. | 219/10.81 |
| 3,270,102 | 8/1966 | Aiken | 425/174.8 R |
| 3,312,760 | 4/1967 | Berner | 425/329 |
| 3,532,848 | 10/1970 | Loring, Jr. et al. | 219/10.81 |
| 3,640,662 | 2/1972 | Schwartz | 425/174.8 R |
| 4,025,257 | 5/1977 | Sagane et al. | 425/329 |
| 4,221,950 | 9/1980 | Lamberts et al. | 219/10.81 |
| 4,316,709 | 2/1982 | Petersson et al. | 425/174.8 E |

*Primary Examiner*—Jay H. Woo
*Assistant Examiner*—James C. Housel
*Attorney, Agent, or Firm*—McCormick, Paulding & Huber

[57] ABSTRACT

The invention relates to an appliance for heating an electroconductive material, preferably one which hardens as a result of this heating process, this material being in the form of a continuous strand which is guided inside a channel (14). In this appliance, a high-frequency generator (23) is provided, two capacitor-plates (30) being arranged on two oppositely-located sides of the channel (14), which sides are formed by walls (10 to 13) composed of an electrically insulating material, these capacitor-plates (30) being staggered by at least their length and being connected to a non-earthed terminal of the high-frequency generator (23), while two further capacitor-plates (31, 32) are arranged on each of the two sides, adjacent to the two capacitor-plates (30), these further capacitor-plates (31, 32) being connected to the earthed terminal of the high-frequency generator (23) and extending along the channel (14) for a distance such that the strand outside the heating zone is no longer at a potential. The appliance can be used, in particular, in a belt-type continuous-moulding unit for the manufacture of blanks for building materials, starting from a raw mixture having a high dielectric coefficient.

16 Claims, 3 Drawing Figures

APPLIANCE FOR HEATING AN ELECTROCONDUCTIVE MATERIAL IN THE FORM OF A CONTINUOUS STRAND

The invention relates to an appliance for heating an electroconductive material in the form of a continuous strand, as well as to the use of this appliance for the production of blanks for building materials, in particular blocks or bricks for walls.

In the production of blanks, in particular for the manufacture of blocks or bricks for walls based on calcium silicate, it is known, from European patent application No. 0,038,552, to use a mould in which two oppositely-located walls are employed as capacitor-plates, these plates being connected to a high-frequency generator. The mould is filled with raw mixture by means of a filling apparatus, the mixture is heated, in the mould, by the high-frequency field, as a result of which it is hardened to an adequate degree, the resulting moulding being subsequently removed from the mould and transported away. A working procedure of this nature calls for a system for circulating the moulds, which operates cyclically, the cycle being defined essentially by the length of time which the raw mixture, present in the mould, requires in order to develop the desired strength. However, very rapid heating, that is to say a short cycle-time, cannot always be achieved, especially when the raw mixture contains a high proportion of foam in order to manufacture light-weight building materials, since the air present in the foam-pores expands and exerts high pressure, so that, in such cases, preference must be given to comparatively long cycle-times which, however, adversely affect the productivity. Moreover, the system required for circulating the moulds renders the appliance expensive and complicated.

In addition, it is known, from German Auslegeschrift No. 859,122, in the manufacture of porous synthetic resin mouldings or plaster mouldings, to introduce the raw mixture into a channel which is formed by four synchronously-driven belts, these belts being led through a heating chamber. In this case, the heat-transfer takes place by heat-conduction, the resulting heating-times being comparatively long, especially in the case of a raw mixture containing a high proportion of foam, which causes the heat-conduction to be poor, while the resulting heating is in no way regular in terms of the volume, the inward-moving, progressive heating leading to crack-formation as a result of the non-uniform expansion of the foam-pores.

Moreover, it would also be difficult to replace the heating chamber of this appliance by capacitor-plates connected to a high-frequency generator, since the continuous strand would be on potential with respect to ground as it emerges, and would, in addition, radiate like an antenna.

The object of the invention is to provide an appliance in which the continuous strand is earthed as it emerges from the channel, and does not radiate.

This object is achieved in accordance with the characterising clause of claim 1.

By this means, the strand is reliably earthed, without conductive contact, in that the leaking lines of flux are received by the earthed capacitor-plates, which are lengthened appropriately, so that the emerging strand is at earth potential and, moreover, cannot radiate.

Further embodiments of the invention can be inferred from the sub-claims, and from the description which follows.

In the text which follows, the invention will be explained in more detail by reference to the illustrative embodiments which are represented in the attached illustrations, in which.

Figure 1:
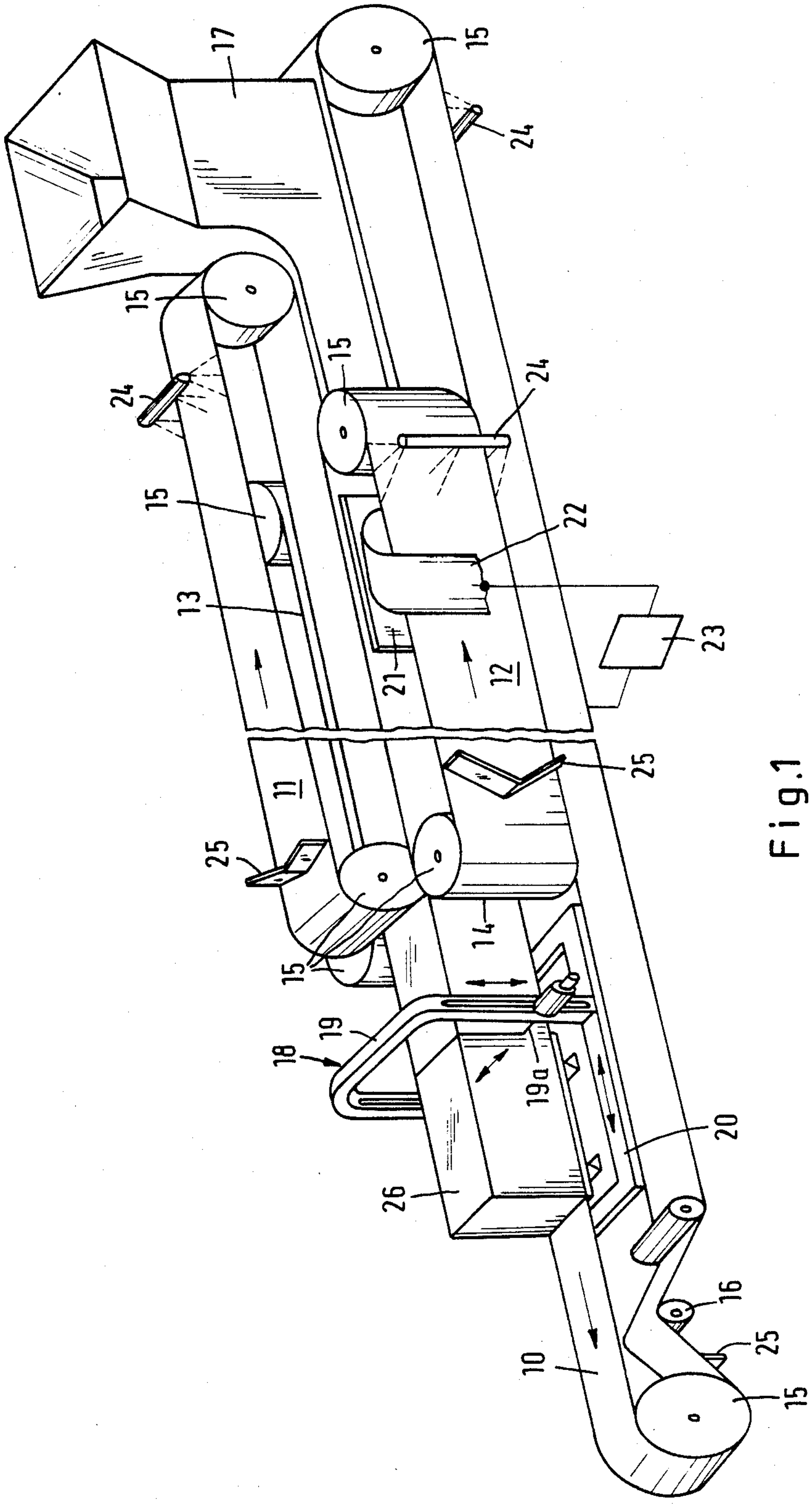
FIG. 1 shows, diagrammatically and in perspective, a belt-type continuous-moulding unit possessing an appliance for heating the continuous strand.

The belt-type continuous-moulding unit represented in FIG. 1 comprises four belts, 10, 11, 12 and 13, which are arranged in a manner such that, between themselves, they form a rectangular channel 14. The belts 10 to 13 are led around rollers 15 and are synchronously driven by means of a drive which is not represented. In addition, in the region of the channel 14, the belts 10 to 13 are supported, to the extent which is necessary, by means of supporting grids, which are not represented, while the vertical belts, 12 and 13, can additionally be guided, at their edges, by means of slide-tracks. The lower horizontal belt, 10, is extended beyond the exit end of the channel 14, and is led over a compensating roller, 6, in order to regulate the manner in which the belt runs.

A filling hopper 17 opens into the entry region of the channel 14, between the belts 10 and 13, this filling hopper being expediently installed in a manner enabling it to be moved out of the entry region of the channel 14, for cleaning purposes, this being accomplished, for instance, by means of a piston/cylinder unit. The outlet opening of the filling hopper 17 is located in the entry region of the channel 14.

A cutting apparatus 18 is installed at the exit end of the channel 14, which cutting apparatus is capable of being moved from a starting position, in the forward-feed direction of the belt 10, synchronously with the forward-feed speed of the belt 10, and of being moved back into the starting position after having carried out the cutting operation. In the embodiment represented, the cutting apparatus 18 possesses a hoop 19 which receives a cutting wire 19*a* in a manner permitting reciprocating movement and permitting adjustment in the vertical direction, in accordance with the manner in which the cutting operation proceeds, and which can be moved by means of a carriage 20.

It is possible to install a belt-weighing section in succession to the cutting apparatus 18.

The belts 10 to 13 are preferably composed of a plastic which does not conduct electricity, while a capacitor-plate assembly 21 is installed adjacent to each of the belts 12 and 13, and, in particular, on the out side of those portions of these belts which form the entry region of the channel 14, each of these capacitor-plate assemblies being connected, via appropriate lines 22, to a high-frequency generator 23.

If a raw mixture for the manufacture of calcium silicate blocks is introduced into the filling hopper 17, such a mixture being composed, for example, of quartz sand, lime, water, cement (with accelerator) and foam, it enters the channel 14 and is confined to the predetermined channel cross-section by the belts 10 to 13. The capacitor-plate installation 21 heats the raw mixture in the channel 14 to a temperature of, for example, 50° C., so that it hardens as a result of the strength-generating reactions, involving the cement, which are initiated by this rise in temperature. At the same time, it becomes possible to work with a relatively low temperature-rise, in that the capacitor-plate installation 21 is designed with an appropriate length, exceeding that of the blanks to be manufactured, by a factor of, for example, 2. The pressure build-up in the foam-pores of the raw mixture can then take place correspondingly more slowly. In addition, the raw mixture can, while being heated, expand towards the filling hopper 17, it being expedient to maintain a substantially constant level of raw mixture in the filling hopper 17 at all times, so that the raw mixture in the filling hopper 17 exerts a substantially constant pressure on the strand which is present in the channel 14, and which is hardening.

The strand, composed of raw mixture, hardening in the channel 14, is conveyed to its exit end by means of the belts 10 to 13. During this process, there is no relative movement between the strand and the belts 10 to 13, or among the belts 10 to 13 themselves, so that the wear problems are also minimal.

In order to ensure that the belts 10 to 13 separate easily from the hardened strand at the exit and of the channel 14, the belts 10 to 13 are sprayed with a release agent prior to being reversed to form the channel 14, spraying being effected by means of spraying devices 24. In addition, scrapers 25 are provided, which remove any material which may be adhering to the belts 10 to 13.

After the hardened strand has emerged from the channel 14, it is transported onward by the lower belt 10, and is divided up into individual blanks by means of the cutting apparatus 18. The detached blanks 26 can then, if appropriate, be weighed on a belt-weighing section, in order to be able, by this means, to make subsequent adjustments to the composition of the raw mixture, in order to achieve as uniform a bulk density in the blanks 26 as possible.

In addition, it is possible to utilise the waste heat from the high-frequency generator 23, in that the warm air which is produced by the generator cooling system is blown onto the blanks 26, for instance by means of a hood, in order to subject them to a second hardening treatment, so that they possess a strength which is sufficient for their subsequent transport to an autoclave, but which does not have to be developed entirely by means of the capacitive heating. The channel 14 is designed with a length such that the emerging strand possesses a desired strength which, if appropriate, is increased to the necessary value by means of the second heating treatment, using warm air from the generator cooling system or, alternatively, from some other source of heat.

That region of the channel 14 which extends from the filling hopper 17 to the cutting apparatus 18 is expediently housed in a casing, this casing being omitted from the illustration.

In order to be able to produce different moulding-sizes, it is expedient for the belts 10 to 13, with their rollers 15, and with their supporting grids and slide-guides, to be adjustable in terms of their belt-planes, in order, in this way, to be able to alter the cross-section of the channel 14. The length of the blanks 26 can be altered by altering the timing of the cutting apparatus 18.

It is expedient for the forward-feed speed of the belts 10 to 13 to be controllable and, in particular, for the speed to be controllable in an infinitely variable manner, in order to be able to match the forward-feed speed, in an appropriate manner, to the heating rate and to the size of the capacitor-plate installation 21.

The belt-type continuous-moulding unit is suitable, for example, for the manufacture of blanks for wall-building blocks, in particular lightweight building blocks, based, for instance, on calcium silicate, aerated concrete, or foamed concrete, or for blocks which are produced from heavy clay materials, the raw mixtures containing high proportions of foam and water, so that bulk densities ranging down to 0.2 $g/cm^3$ are obtained. In addition, it is possible to utilise the generator output in an optimum manner.

Figure 2:
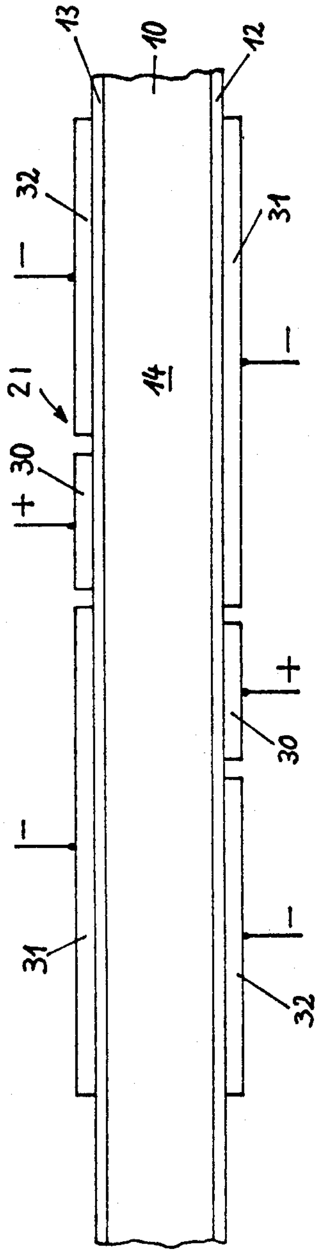
FIGS. 2 and 3 show the embodiments of the arrangement of the capacitor-plates of the appliance for heating the continuous strand.

The capacitor-plate installation 21 represented in FIG. 2 comprises two capacitor-plates 30, one of which is arranged on the outside of each of the belts 12 and 13, staggered, relative to the other plate, by a minimum distance approximating to the plate length, and connected to the non-earthed terminal of the high-frequency generator 23, this terminal being marked "+". Two further capacitor-plates 31 are installed, one on the outside of the belt 12, and the other on the outside of the belt 13, adjacent to the two capacitor-plates 30 but spaced clear of them, and connected to the earthed terminal of the high-frequency generator 23, this terminal being marked "−". In this arrangement, the capacitor-plates 31, 32 extend sufficiently far along the channel 14 that the outgoing lines of flux, leaking from the capacitor-plates 30, are received by the capacitor-plates 31, 32 on either side of the capacitor-plates 30, so that the strand inside the channel 14, but outside the heating zone, is no longer on potential with respect to ground. In this arrangement, the capacitor-plates 30, 31 and 32 can simultaneously serve as supporting elements for the belts 12, 13.

Figure 3:
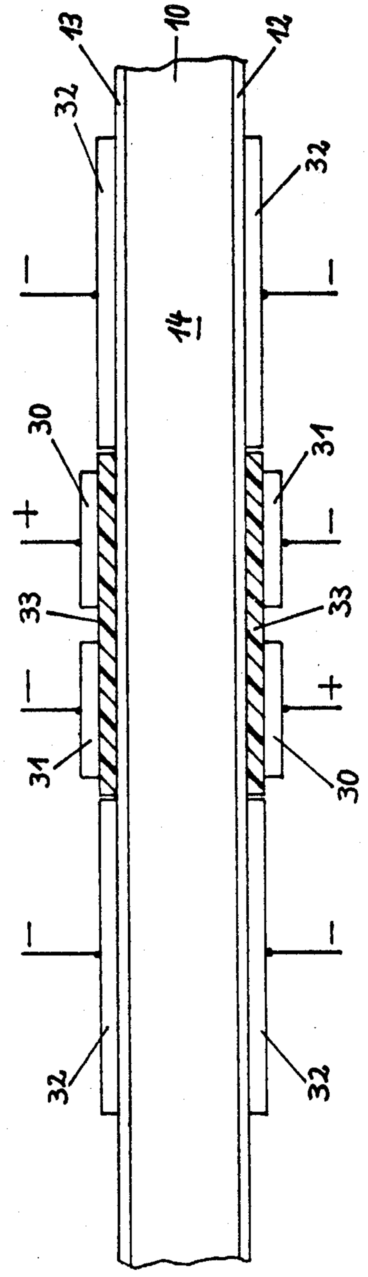

In the case of the capacitor-plate installation 21, represented in FIG. 3, a plate 33, made of a material which does not conduct electricity, for instance a plastic, is installed adjacent to the belts 12,13, between these belts and the capacitor-plates 30, in the longitudinal zone which is occupied by the capacitor-plates 30, the plates 33 being capable of forming a guide-box through which the belts 10 to 13 run. The earthed capacitor-plates 31 are installed adjacent to the capacitor-plates 30, in the zone of the plates 33, while capacitor-plates 32 adjoin this zone, bearing against the belts 12, 13 and guiding them. In this arrangement, the plates 33 enable the capacitance of the capacitor-plate installation 21 to be optimally adjusted to the generator output. In addition, arrangements can be made whereby the capacitor-plates 30, 31 can be adjusted with regard to their distance from the adjacent belts 12, 13, in order to match the capacitance of the multi-layer capacitor which is formed by the capacitor-plates 30, 31, the plates 33 and the air-gap present between them, the adjacent portions of the belts 12 and 13, and the raw mixture which is present between the belts, to the output of the high-frequency generator 23, in a manner such that its oscillating circuit operates, as far as possible, in resonance.

The belts 12 and 13 of the channel 14 expediently possess a dielectric coefficient which is considerably lower than that of the raw mixture which is being conveyed in the channel 14 and, in particular, the product of the dielectric coefficient and the loss angle, for the belts, is considerably lower than the corresponding product for the mixture in the channel 14, so that the belts 12, 13 remain virtually cold and are not heated with the mixture. Corresponding considerations apply in the case of the plates 33.

Instead of being located in the region of the belts 12, 13, the capacitor-plate installation 21 can also be installed in the region of the filling hopper 17, which must then have an appropriate length, and be manufactured from a suitable material.

The appliance permits true capactive heating, even in the case of a raw mixture which is electrically conductive and possesses a relatively high dielectric coefficient, in conjunction with optimum utilisation of the generator output, it being possible, in addition, to operate at a reduced frequency, thereby simplifying the implementation of this technique under industrial conditions. In addition, the raw mixture is subjected to resistance-heating, corresponding to the imaginary part of its complex dielectric coefficient. In addition, a high dielectric strength is obtained, and the choice of the generator voltage becomes more straightforward. The raw mixture can have a water and foam content in excess of 50% by weight.

While only one embodiment of the invention has been shown and described, it will be appreciated that modifications thereof, some of which have been alluded to hereinabove, may still be readily made thereto by those skilled in the art. I, therefore, intend to the appended claims to cover the modifications alluded to therein as well as all other modifications, which fall within the spirit and scope of this invention.

I claim:

1. An Appliance for heating an electroconductive material, preferably one which hardens as a result of this heating process, this material being in the form of a continuous strand comprising: a high-frequency generator (23), a channel (14) formed by walls (10 to 13) composed of an electrically insulating material and within which the continuous strand is guided, two capacitor-plates (30) arranged on two oppositely located sides of the channel (14), the capacitor plates (30) being staggered by at least their length and being connected to a non-earthed terminal of the high-frequency generator (23), while two further capacitor plates (31,32) are arranged on each of the two sides, adjacent to the two capacitor plates (30), the further capacitor plates (31, 32) being connected to the earthed terminal of the high-frequency generator (23) and extending along the channel (14) for a distance such that the strand outside the heating zone is no longer on poential with respect to earth potential.

2. Appliance according to claim 1, characterised in that the capacitor-plates (30, 31, 32) support the flexible walls (12, 13) of the channel (14).

3. Appliance according to claim 1, characterised in that, between the capacitor-plates (30, 31) the walls (10 to 13) of the channel (14) are surrounded by a guide-box (33), made of an electrically insulating material, at least in the longitudinal zone occupied by the capacitor-plates (30) which are connected to the non-earthed material of the high-frequency generator (23).

4. Appliance according to claim 1, characterised in that the distance of the capacitor-plates (30, 31) from the walls (12, 13) of the channel (14) is adjustable.

5. Appliance according to claim 1, characterised in that separate, earthed capacitor-plates (32) are provided, outside the longitudinal zone occupied by the capacitor-plates (30) which are connected to the non-earthed terminal of the high-frequency generator (23).

6. Appliance according to claim 5, characterised in that the capacitor-plates (32) bear against the walls (12, 13) of the channel (14).

7. Appliance according to claim 1, characterised in that the walls (12, 13) of the channel (14) possess a relatively low dielectric coefficient and, in particular, a product of loss angle and dielectric coefficient which is lower than the corresponding product for the material to be heated.

8. Appliance according to claim 7, characterised in that the walls (12, 13) are composed of a plastic.

9. A device for the manufacture of blanks (26) for building materials, in particular wall-building blocks, from a pourable raw mixture containing a binder which can be activated by heat, preferably a hydraulic binder, comprised by: a channel (14) receiving the raw mixture containing the binder at an entrance end and being formed by four synchronously-driven belts (10 to 13) made from an electrical insulating material for moving the material forward from the entrance end toward an exit end, a cutting apparatus (18) installed at the exit end of the channel (14), which cutting apparatus is synchronised with the speed at which the strand is fed through the channel and which is capable of being moved, in the forward-feed direction, from a starting position, and of being moved back into this starting position, and an appliance for heating the raw mixture within the channel (14), the appliance including a high-frequency generator (23), a first two capacitor plates (30) being arranged on two oppositely disposed sides of the channel (14), the plates (30) being staggered by at least their length and being connected to a non-earthed terminal of the high-frequency generator (23), and a second two capacitor plates (31, 32) arranged on each of the two sides of the channel and adjacent the first two capacitor plates (30), the second capacitor plates (31, 32) being connected to the earthed terminal of the high-frequency generator (23) and extending along the channel (14) for distance such that the strand outside the heating zone of the channel between the plates is no longer at a different potential from earth potential.

10. Device according to claim 9, characterised in that one belt (10) is arranged to extend, as a transport belt, beyond the exit end of the strand, and the cutting apparatus (18) is installed in the region at the exit end.

11. Device according to claim 9, characterised in that a reheating apparatus is installed at the exit end of the channel (14), preferably in succession to the cutting apparatus (18).

12. Device according to claim 11, characterised in that the reheating apparatus is connected with the high frequency generator (23) and is fed by waste heat from the generator.

13. Device according to claim 9, characterised in that of the capacitor-plates (30) which are arranged adjacent to the belts (12, 13) and are connected to the non-earthed terminal of the high-frequency generator (23) have a length along the belts which is considerably larger than the length of a blank (26) which is to be manufactured.

14. Device according to claim 9, characterised in that the forward-feed speed of the belts (10 to 13) can be controlled in a continuously variable manner.

15. Device according to claim 9, characterised in that at least one belt (10 to 13) is adjustable in terms of its positioning with respect to the opposite belt.

16. Device according to claim 9, characterised in that a belt-weighing section is provided in succession to the cutting apparatus (18).

* * * * *